Patented July 6, 1954

2,683,161

UNITED STATES PATENT OFFICE 2,683,161

STABILIZATION OF ARYL ALKANE SULFONATES

William S. Knowles, Kirkwood, Mo., and Joachim Dazzi, Dayton, Ohio, assignors to Monsanto Chemical Company, St. Louis, Mo., a corporation of Delaware No Drawing. Application October 12, 1950, Serial No. 189,881

11 Claims. (Cl. 260—456)

1

This invention relates to aryl alkane sulfonates; more specifically, this invention relates to stabilized aryl alkane sulfonates having the formula

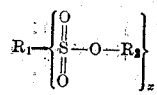

$$R_1 \!-\! \left[\!\! \begin{array}{c} O \\ \| \\ S\!-\!O\!-\!R_2 \\ \| \\ O \end{array} \!\!\right]_x$$

wherein $R_1$ represents an aliphatic radical derived from a petroleum hydrocarbon containing saturated branched chain hydrocarbons, $R_2$ represents a phenyl radical and $x$ represents an integer. This invention also relates to a process for stabilizing such aryl alkane sulfonates. This invention further relates to vinyl halide polymers plasticized with the above described aryl alkane sulfonates.

The aryl alkane sulfonates have been prepared by a two-step reaction. A saturated aliphatic hydrocarbon is reacted with chlorine and sulfur dioxide in the presence of light to give a mixture of alkane mono and polysulfone chlorides. This mixture is then reacted with a phenol in the presence of either sodium hydroxide, ammonia or other alkali to give the corresponding aryl alkane sulfonates. Heretofore, the mixture of the aryl esters of alkane mono and polysulfonates thus obtained was then separated from the excess alkane by fractionation under reduced pressure at a temperature below 110° C., or by steaming at a temperature below 110° C., with the latter method being preferred in those instances when long chain aliphatic hydrocarbons have been utilized.

In the past these aryl alkane sulfonates have been made principally from straight chain hydrocarbons or those obtained from the Fischer-Tropsch hydrocarbon synthesis followed by hydrogenation. The aryl alkane sulfonates thus obtained utilizing these straight chain hydrocarbons, have proven to be exceptionally good plasticizers for vinyl halide-containing polymers, such as polyvinyl chloride or vinyl chloride copolymerized with unsaturated materials copolymerizable therewith. Such plasticized polymeric vinyl chloride compositions have been found to be exceedingly stable and exceptionally flexible, particularly at low temperatures.

Straight chain hydrocarbons are rather expensive. For this reason, the aryl alkane sulfonates when made from straight chain hydrocarbons have not enjoyed wide spread use as plasticizers.

In an effort to obtain a cheaper aryl alkane sulfonate without sacrificing efficiency as a plasticizer, the use of petroleum hydrocarbons as a

2 source of the saturated aliphatic hydrocarbon was invesigated. Petroleum hydrocarbons are rather inexpensive and readily available. They contain a high proportion of branched chain saturated aliphatic hydrocarbons. It was found, however, that aryl alkane sulfonates prepared in accordance with the procedures heretofore employed for preparing the aryl alkane sulfonates, but utilizing a saturated aliphatic hydrocarbon derived from a petroleum hydrocarbon in place of a straight chain aliphatic hydrocarbon, were of little utility as plasticizers for a vinyl chloride-containing polymer. Surprisingly, it was found that vinyl chloride polymers containing such aryl alkane sulfonates deteriorated so rapidly and so completely during processing that the resultant compositions had little or no utility, being hard and brittle and exceptionally dark in color.

It is an object of this invention to provide improved aryl alkane sulfonates.

It is another object of this invention to provide improved stabilized aryl alkane sulfonates prepared from petroleum hydrocarbons.

Still another object of this invention is to provide stabilized aryl alkane sulfonates made from petroleum hydrocarbons and having utility as a plasticizer for vinyl chloride-containing polymers.

Another object of this invention is to provide a method for stabilizing aryl alkane sulfonates prepared from petroleum hydrocarbons thereby producing improved aryl alkane sulfonates made from petroleum hydrocarbons having utility as a plasticizer for vinyl chloride-containing polymers.

Another object of this invention is to provide improved resinous compositions comprising a vinyl chloride-containing polymer and as a plasticizer therefor, aryl alkane sulfonates made from petroleum hydrocarbons.

Other objects of this invention will be evident from the description of the invention which follows.

As previously mentioned, petroleum hydrocarbons contain a high proportion of branched chain saturated aliphatic hydrocarbons, and aryl alkane sulfonates made from such a petroleum hydrocarbon can not be utilized as plasticizers for vinyl chloride-containing polymers, as such compositions decompose under the processing conditions normally encountered during the preparation of such resinous compositions. It has now been discovered that aryl alkane sulfonates prepared from petroleum hydrocarbons may be effectively stabilized so as to prevent decomposition during the processing of a resinous composition comprising a vinyl halide-containing polymer and the aryl alkane sulfonate as a plasticizer therefor. According to the novel process of this invention, such a stabilized aryl alkane sulfonate prepared from petroleum hydrocarbons is obtained by heating the aryl alkane sulfonate at an elevated temperature, preferably in the range of from about 110° C. to about 300° C., causing the formation of a small quantity of a gaseous product which is then removed, preferably under reduced pressure. The stabilized aryl alkane sulfonates thus obtained may be incorporated into a vinyl chloride-containing polymer as a plasticizer therefor, and the resinous composition processed under the conditions heretofore utilized without decomposition. Such a process of stabilization has been designated as a degasification process.

The novel degasification process of this invention and the novel stabilized products obtained therefrom and the superiority of this improved process and product over those heretofore known will be made clearly evident by a consideration of the data set forth in the following examples, wherein Example I is illustrative of the process and product heretofore known:

Example I

A reactor equipped with a mercury vapor light is charged with 1,000 g. of a saturated hydrocarbon (Shell Base Oil C, approximately a 16 carbon atom branched alkane). Chlorine and sulfur dioxide are then added at 22.0 g. per hour and 23.0 g. per hour respectively. The temperature is held at 5° C. and the reaction continued until the specific gravity of the reaction mixture is 0.968 at 11° C.

The crude material is then evacuated to remove dissolved gases, and then at 25° C., 316 g. of phenol are added. At this same temperature, 268 g. of a 50% solution of sodium hydroxide are added over a period of 2.5 hours. The mixture is heated to 45° C. and held at that temperature for approximately 3 hours. The sodium chloride and excess sodium hydroxide are then removed by washing with water.

Water and unreacted hydrocarbons are then removed from the crude ester mixture by distillation under a reduced pressure at a temperature below 100° C., leaving a mixture of aryl esters of alkane mono- and poly-sulfonates containing about 65% of the monosulfonate and the balance being essentially polysulfonates.

A mixture containing 100 parts by weight of the polyvinyl chloride and 66 parts by weight of the aryl alkane sulfonate above prepared is placed on a differential roll mill maintained at a temperature of 325° F. A homogeneous plasticized polyvinyl chloride composition can not thus be formed. Almost immediately upon application of the mixture to the roll mill, severe decomposition begins to take place, accompanied by a considerable evolution of gaseous decomposition products. The composition appears to deteriorate rapidly, becoming quite dark in color with a charred appearance. The resultant polyvinyl chloride composition is hard, brittle and heterogeneous in nature.

Example II

A reactor equipped with a mercury vapor light is charged with 1,000 g. of a saturated hydrocarbon (Shell Base Oil C, approximately a 16 carbon atom branched alkane). Chlorine and sulfur dioxide are then added at 22.0 g. per hour and 23.0 g. per hour respectively. The temperature is held at 5° C. and the reaction continued until the specific gravity of the reaction mixture is 0.968 at 11° C.

The crude material is then evacuated to remove dissolved gases, and then at 25° C., 316 g. of phenol are added. At this same temperature, 268 g. of a 50% solution of sodium hydroxide are added over a period of 2.5 hours. The mixture is heated to 45° C. and held at that temperature for approximately 3 hours. The sodium chloride and excess sodium hydoxide are then removed by washing with water.

The crude ester is then dried by heating to a temperature of 100°-110° C. under a reduced pressure of 75-100 mm. Hg absolute. Then under a reduced pressure of 150-180 mm. Hg absolute, the ester is heated to a temperature of 195-200° C. While maintaining this temperature, the vacuum is gradually increased in order to keep a rapid stream of unreacted hydrocarbon distilling over. During this procedure, a small amount of HCl is evolved and removed through the vacuum pump. The vacuum is gradually increased until a pressure of 1.5-2 mm. Hg absolute is obtained while maintaining a temperature of 195-200° C., under which conditions the ester is maintained for at least one hour. The vacuum is then released and the aryl alkane sulfonates allowed to cool to room temperature. The mixture of aryl alkane sulfonates thus obtained contains essentially the same ratio of monosulfonate to polysulfonate as that obtained in Example I.

A mixture of 100 parts by weight of polyvinyl chloride and 66 parts by weight of the above prepared aryl alkane sulfonate is milled on a differential roll mill maintained at a temperature of 325° F. for a period of approximately 5 minutes, whereupon a homogeneous plasticized polyvinyl chloride composition is formed. The resulting composition is pressed into the form of a sheet in a suitable mold under a pressure of approximately 4,000 lbs. per square inch and at a temperature of 325° F.

The plasticized polyvinyl chloride sheet thus obtained is transparent and quite flexible, both at room temperature and at relatively low temperatures. The composition thus obtained possesses a low temperature flexibility of −24° C. when determined in accordance with the method of Clash and Berg, as described in Ind. Eng. Chem., 34, 1218 (1942), a method well known to those skilled in the art of the evaluation of polyvinyl chloride compositions.

A portion of the above prepared plasticized polyvinyl chloride sheet is heated for 24 hours in a Freas circulating air oven at 105° C. After such a heating period, it is found that approximately only 2.92% of the aryl alkane sulfonate has been lost through volatilization.

A comparison of the results set forth in Examples I and II clearly indicates the outstanding advantages of the novel degasification process of this invention and the stabilized aryl alkane sulfonate resulting therefrom. In Example I, the aryl alkane sulfonate made from a petroleum hydrocarbon was not subjected to this degasification process. As a result, a satisfactory plasticized polyvinyl chloride composition could not be prepared therefrom. In Example II, the aryl alkane sulfonate, made from a petroleum hydrocarbon in the same manner as was done in Example I, after application of the novel degasification process of this invention, could be utilized in preparing an extremely stable and useful plasticized polyvinyl chloride composition.

This new and unexpected behavior is related specifically to aryl alkane sulfonates derived from petroleum alkanes. When aryl alkane sulfonates are prepared from alkanes made up essentially of the normal paraffinic hydrocarbons such as the hydrogenated Fischer-Tropsch hydrocarbons, the aryl alkane sulfonates are stable and the degasification process is unnecessary.

*Example III*

In a manner similar to that described in Example II, a petroleum hydrocarbon which consists essentially of 10–12 carbon atom branched alkanes is treated with chlorine and sulfur dioxide and subsequently with phenol in the presence of sodium hydroxide to prepare a crude mixture of aryl alkane sulfonates. After washing the crude aryl alkane sulfonates to remove the sodium chloride and excess sodium hydroxide, the aryl alkane sulfonates are then subjected to a steaming operation at a temperature below 110° C. to remove any unreacted hydrocarbons.

After this steaming operation, the mixture of aryl alkane sulfonates is then dehydrated by heating at a temperature of approximately 100–110° C. under a reduced pressure. The temperature is then raised to approximately 190° C. and the pressure reduced to approximately 3 mm. Hg absolute under which conditions the aryl alkane sulfonate is maintained for a period of about 2 hours. The gaseous products which are evolved during this degasification process are removed under the reduced pressure.

The resultant mixture of aryl alkane sulfonates may be incorporated into a vinyl chloride-containing polymer without decomposition during the processing of the resinous composition on a differential roll mill.

*Example IV*

In a manner similar to that described in Example II, a petroleum hydrocarbon consisting essentially of branched chain alkanes containing from 20–24 carbon atoms, is reacted with chlorine and sulfur dioxide and subsequently with phenol in the presence of an excess of sodium hydroxide to form a crude mixture of aryl alkane sulfonates.

The crude mixture of aryl alkane sulfonates is then washed with water, to remove the sodium chloride and excess sodium hydroxide. The crude ester is then dehydrated by heating to a temperature of 100–105° C. under a reduced pressure.

After dehydration, the temperature is raised to approximately 200° C. and the pressure lowered to approximately 0.2 mm. Hg absolute or lower under which conditions the ester is maintained for approximately 1 hour.

After this degasification process the ester is then fractionally distilled recovering a substantially pure mixture of aryl alkane sulfonates which may be incorporated as a plasticizer into a vinyl chloride-containing polymer without decomposition during processing on a differential roll mill.

*Example V*

Example II is repeated with the exception of utilizing in place of the polyvinyl chloride, a copolymer of 90 parts by weight vinyl chloride and 10 parts by weight vinyl acetate. The resultant resinous composition has properties quite similar to those obtained on the resinous composition prepared in Example II.

*Example VI*

The procedure set forth in Example I is repeated with the exception that in place of the polyvinyl chloride, a copolymer of 90 parts by weight of vinyl chloride and 10 parts by weight of vinyl acetate is utilized. The resultant composition has little utility as a resinous composition inasmuch as considerable deterioration and discoloration took place during the processing of the resinous composition, resulting in a hard, brittle, heterogeneous composition.

*Example VII*

The procedure set forth in Example II is repeated utilizing in place of the polyvinyl chloride, a copolymer of 90 parts by weight of vinyl chloride and 10 parts by weight of vinylidene chloride. A clear tough transparent, resinous sheet is obtained characterized by exceptionally good flexibility.

*Example VIII*

The procedure set forth in Example II is repeated except that the polyvinyl chloride is replaced by a copolymer of 90 parts by weight of vinyl chloride and 10 parts by weight of diethyl maleate. The resinous composition thus obtained is extremely flexible, tough, transparent and possesses no evidence of decomposition as a result of subjection to the processing conditions.

*Example IX*

The procedure set forth in Example II is repeated, utilizing in place of the 66 parts by weight of the aryl alkane sulfonate, a mixture containing 20 parts by weight of the aryl alkane sulfonate and 20 parts by weight of di(2-ethylhexyl) phthalate. The resultant resinous composition is clear, tough, extremely flexible, and possesses no evidence of decomposition or deterioration.

The properties of the synthetic resinous compositions prepared in the preceding examples, illustrate the outstanding utility of this invention. As a result of this novel degasification process and the improved stabilized aryl alkane sulfonates resulting therefrom, aryl alkane sulfonates made from petroleum hydrocarbons may now be utilized in vinyl chloride-containing polymers to prepare plasticized, resinous compositions characterized by extreme toughness, good flexibility and outstanding retention of physical properties even under adverse conditions.

Specific modifications of this novel invention have been illustrated in the preceding examples. Obviously, however, the specific reactants, reaction conditions and quantities of reactants specified therein may be varied considerably without departing from the scope of this invention. For example, in preparing the aryl alkane sulfonates from petroleum hydrocarbons, any saturated petroleum hydrocarbon may be utilized inasmuch as all such hydrocarbons contain a considerable amount of branched chain alkane groups. The degree or the nature of the branching in the branched chain alkanes or the actual quantity of the branched chain alkanes present in the particular petroleum hydrocarbon utilized, is of no consequence from the standpoint of the operability of this invention. The stability of all branched chain hydrocarbons derived from petroleum hydrocarbons may be significantly improved by subjecting the petroleum hydrocarbon to the novel degasification process described herein. While the degree of increased stability desired in a petroleum hydrocarbon to permit its use as a plasticizer for a vinyl chloride-containing polymer, will vary depending upon the nature of the branching of the alkane and the quantity of the branched chain alkane in the petroleum hydrocarbon, this variation is one of degree only and not of kind. The aryl alkane sulfonates made from petroleum hydrocarbons which contain branched chain alkane groups and containing from 6 to 24 carbon atoms and are essentially free of aromatics, have been found to respond most advantageously to this novel degasification process.

Similarly, while the preceding examples have illustrated those aryl alkane sulfonates wherein the aryl group is a phenyl group, i. e., an aryl alkane sulfonate made from phenol, mono or poly substituted phenols may also be utilized. Thus, the aryl radical in the aryl alkane sulfonate made from a petroleum hydrocarbon may contain one or more inert substituents of which the following are illustrative: halogens, such as chlorine, bromine, iodine and fluorine; alkyl groups, such as methyl, ethyl, propyl, isopropyl, butyl, tert.-butyl, etc.; aryl groups, such as tert.-butyl phenyl, etc.; alkoxy groups, such as methoxy, ethoxy, propoxy, isopropoxy, etc.

The aryl alkane sulfonates utilized in this invention may be prepared by any convenient method well known to those skilled in the art. A particularly simple and useful method comprises reacting a saturated petroleum hydrocarbon with chlorine and sulfur dioxide in the presence of an activator, such as light, peroxides, etc., to form alkane sulfone chlorides, which are then reacted with a phenol in the presence of an alkali, such as an alkali metal hydroxide, ammonia, the alkaline earth metal hydroxides, or the alkali metal or alkaline earth metal carbonates. This latter reaction may be carried out either in the presence or absence of a suitable inert reaction medium. The crude alkane sulfonates thus formed may then be separated from unreacted alkanes by any method well known to those skilled in the art, such as by fractionation under reduced pressure or by steaming.

The aryl alkane sulfonates with which this invention are concerned may be the aryl esters of alkane monosulfonates, the aryl esters of alkane polysulfonates or mixtures thereof. Such aryl alkane sulfonates may be represented by the previously described formula.

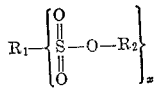

wherein $R_1$ represents an aliphatic radical derived from a petroleum hydrocarbon containing saturated branched chain hydrocarbons, $R_2$ represents a phenyl radical and $x$ represents an integer. Constituting a particularly useful and preferred embodiment of this invention are those aryl alkane sulfonates having the above formula wherein $x$ represents an integer from 1 to 3 inclusive.

In carrying out the novel degasification process of this invention, the aryl alkane sulfonate made from petroleum hydrocarbons is heated at an elevated temperature in the range of from about 110° C. to about 300° C. and preferably in the range of from about 170° C. to about 225° C. During this heating period, a gaseous product is formed which is then removed by any convenient method. Thus, the gaseous reaction product may be removed by merely blowing the heated aryl alkane sulfonate with air or by placing the heated aryl alkane sulfonate under reduced pressure, such as in the range of from about 0.05 mm. to 300 mm. Hg absolute, with the latter method being preferred. The time of this degasification treatment will necessarily vary to a certain extent dependent upon the nature of the petroleum hydrocarbon utilized to prepare the aryl alkane sulfonate. Those aryl alkane sulfonates prepared from the longer branched chain alkanes, such as those containing from about 18 to 24 carbon atoms, will require a longer degasification treatment than those prepared from the shorter branched chain alkanes. Similarly, the aryl alkane sulfonates prepared from the longer branched chain alkanes are preferably stabilized by treatment at the higher temperatures under lower pressures. The degasification process is preferably continued as long as any significant quantities of a gaseous reaction product are liberated. If in the refining of the aryl alkane sulfonate, a procedure such as steaming is used to remove the unreacted hydrocarbon, then the degasification step and the refining step may be combined as long as the temperatures involved are maintained within the range previously set forth and the gaseous reaction products removed. A combined refining and degasification process is illustrated in Example II.

While the preceding examples also illustrated particular compositions comprised of a vinyl chloride-containing resin and an aryl alkane sulfonate made from a petroleum hydrocarbon, it is also obvious that substantial variation is possible in the preparation and composition of such resinous compositions. Thus, the quantity of the aryl alkane sulfonate utilized in such a composition may vary over a wide range, depending upon the properties desired. An aryl alkane sulfonate content of as low as about 5 parts by weight per 100 parts of the vinyl chloride-containing polymer and as high as 300 parts by weight of the aryl alkane sulfonate per 100 parts of the vinyl chloride-containing polymer, has been found to be useful in preparing improved plasticized synthetic resinous compositions. Furthermore, the aryl alkane sulfonate may be utilized as the sole plasticizer for the vinyl chloride-containing polymer or it may be used in combination with one or more of the commonly used plasticizers for vinyl chloride-containing polymers, thereby obtaining a composition having physical properties attributable to, or resulting from, each of the plasticizer components. Typical of such plasticizers which may be utilized in combination with these aryl alkane sulfonates are di(2-ethylhexyl) phthalate, dibutyl phthalate, tricresyl phosphate, alkyl diaryl phosphates, tri(2-ethylhexyl) phosphate, dibutyl sebacate, alkyl benzyl phthalates, etc.

The novel synthetic resinous compositions of this invention may also have incorporated therein various pigments, fillers, stabilizers, both heat and light, etc.

As indicated by the examples, copolymers of vinyl chloride and other unsaturated materials copolymerizable therewith may be plasticized with the aryl alkane sulfonates in accordance with this invention. For example, copolymers of vinyl chloride with such materials as vinylidene chloride, vinyl esters of carboxylic acids, for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate and the corresponding esters of methacrylic acid; vinyl aromatic compounds, for example, styrene, ortho-chlorostyrene, para-chlorostyrene, 2,5-dichlorostyrene, 2,4-dichlorostyrene, para-ethyl styrene, divinyl benzene, vinyl naphthanate, alpha-methyl styrene; dienes, such as butadiene, chloroprene; amides, such as acrylic acid amide, acrylic acid anilide; nitriles, such as acrylic acid nitrile; esters of alpha, beta-unsaturated carboxylic acids, for example, the methyl, ethyl, propyl, butyl, amyl, hexyl, heptyl, octyl, allyl, methallyl, and phenyl esters of maleic, crotonic, itaconic, fumaric acids and the like. The class of copolymers in which a predominant portion, i. e., more than 50% by weight, of the copolymer is made from vinyl chloride, represents a preferred class of polymers to be treated according to the invention.

A particularly preferred embodiment of the invention comprises compositions comprised of an aryl alkane sulfonate of this invention and a polymer prepared by copolymerizing vinyl chloride and an ester of an alpha, beta-unsaturated dicarboxylic acid, such as diethyl maleate, in which 5 to 20 parts by weight of diethyl maleate are utilized for every 95 to 80 parts by weight of vinyl chloride. Among the preferred esters of alpha, beta-unsaturated dicarboxylic acids are the alkyl esters in which the alkyl group contains from 1 to 8 carbon atoms.

In addition to the above described vinyl chloride-containing polymers, similar polymers wherein the vinyl chloride is replaced, either in whole or in part, by other vinyl halides may be utilized. Typical of such other vinyl halides are vinyl bromide, vinyl fluoride, etc.

While the novel stabilized aryl alkane sulfonates of this invention are particularly useful as plasticizers for vinyl halide-containing polymers, they may also be used as modifiers for cellulose nitrate surface coatings and, because of their stability and relatively high flash points, as functional fluids, particularly as hydraulic fluids.

The vinyl halide polymers plasticized with the novel stabilized aryl alkane sulfonates disclosed herein are claimed in copending application Serial No. 189,882, filed October 12, 1950.

What is claimed is:

1. A process for stabilizing aryl alkane sulfonates having the formula

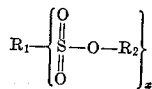

wherein $R_1$ represents a hydrocarbon radical derived from a petroleum hydrocarbon containing saturated open chain alkanes, $R_2$ represents a phenyl radical and $x$ represents an integer, which comprises heating said aryl alkane sulfonate to a temperature in the range of from about 110° C. to about 300° C., and removing the gaseous products thereby formed.

2. The process described in claim 1 wherein the gaseous products are removed under reduced pressure.

3. A process for stabilizing aryl alkane sulfonates having the formula

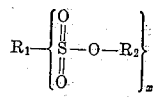

wherein $R_1$ represents a hydrocarbon radical derived from a petroleum hydrocarbon containing saturated open chain alkanes, $R_2$ represents a phenyl radical and $x$ represents an integer from 1 to 3 inclusive, which comprises heating said aryl alkane sulfonate to a temperature in the range of from about 110° C. to about 300° C., and removing the gaseous products thereby formed.

4. The process as described in claim 3 wherein the gaseous reaction products are removed under reduced pressure.

5. A process for stabilizing aryl alkane sulfonates having the formula

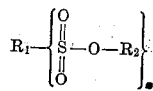

wherein $R_1$ represents a hydrocarbon radical derived from a petroleum hydrocarbon containing saturated open chain alkanes, $R_2$ represents the phenyl radical and $x$ represents an integer, which comprises heating said aryl alkane sulfonate to a temperature in the range of from about 170° C. to about 225° C., and removing under reduced pressure the gaseous products thereby formed.

6. A process for stabilizing aryl alkane sulfonates having the formula

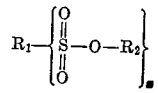

wherein $R_1$ represents a hydrocarbon radical derived from a petroleum hydrocarbon containing saturated open chain alkanes, $R_2$ represents the phenyl radical and $x$ represents an integer from 1 to 3 inclusive, which comprises heating said aryl alkane sulfonate to a temperature in the range of from about 170° C. to about 225° C., and removing under reduced pressure the gaseous products thereby formed.

7. A process for stabilizing aryl alkane sulfonates having the formula

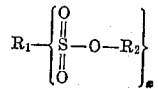

wherein $R_1$ represents a hydrocarbon radical derived from a petroleum hydrocarbon containing a high proportion of branched chain alkanes containing from 6 to 24 carbon atoms, $R_2$ represents the phenyl radical and $x$ represents an integer, which comprises heating said aryl alkane sulfonate to a temperature in the range of from about 170° C. to about 225° C., and removing under reduced pressure the gaseous products thereby formed.

8. A process for stabilizing aryl alkane sulfonates having the formula

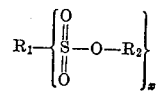

wherein $R_1$ represents a hydrocarbon radical derived from a petroleum hydrocarbon containing a high proportion of branched chain alkanes containing from 6 to 24 carbon atoms, $R_2$ represents the phenyl radical and $x$ represents an integer from 1 to 3 inclusive, which comprises heating said aryl alkane sulfonate to a temperature in the range of from about 170° C. to about 225° C., and removing under reduced pressure the gaseous products thereby formed.

9. In a process for stabilizing aryl alkane sulfonates having the formula

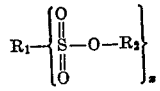

wherein $R_1$ represents a hydrocarbon radical derived from a petroleum hydrocarbon containing saturated open chain alkanes, $R_2$ represents the phenyl radical and $x$ represents an integer, the step which comprises heating said aryl alkane sulfonate to a temperature in the range of from about 170° C. to about 225° C.

10. In a process for stabilizing aryl alkane sulfonates having the formula

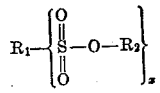

wherein $R_1$ represents a hydrocarbon radical derived from a petroleum hydrocarbon containing a high proportion of branched chain alkanes containing from 6 to 24 carbon atoms, $R_2$ represents the phenyl radical and $x$ represents an integer, the step which comprises heating said aryl alkane sulfonate to a temperature in the range of from about 170° C. to about 225° C.

11. In a process for stabilizing aryl alkane sulfonates having the formula

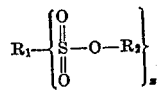

wherein $R_1$ represents a hydrocarbon radical derived from a petroleum hydrocarbon containing a high proportion of branched chain alkanes containing from 6 to 24 carbon atoms, $R_2$ represents the phenyl radical and $x$ represents an integer from 1 to 3 inclusive, the step which comprises heating said aryl alkane sulfonate to a temperature in the range of from about 170° C. to about 225° C.

References Cited in the file of this patent

UNITED STATES PATENTS

| Number | Name | Date |
|---|---|---|
| 2,486,417 | Jackson | Nov. 1, 1949 |

OTHER REFERENCES

Modern Plastics, vol. 24 (No. 7, 1947), pages 154–156, 192, 194.